Dec. 2, 1969  D. R. JONES  3,481,180
VORTEX PROXIMITY SENSOR
Filed March 22, 1967

INVENTOR
DONNIE R. JONES
BY *Hurvitz, Rose & Greene*
ATTORNEYS

United States Patent Office 3,481,180
Patented Dec. 2, 1969

3,481,180
VORTEX PROXIMITY SENSOR
Donnie Roland Jones, Silver Spring, Md., assignor to Bowles Engineering Corporation, Silver Spring, Md., a corporation of Maryland
Filed Mar. 22, 1967, Ser. No. 625,183
Int. Cl. G01b *13/08*
U.S. Cl. 73—37.5    14 Claims

ABSTRACT OF THE DISCLOSURE

The vortex proximity sensor employs a vortex chamber having a tangential input and a centrally located axial egress orifice. The output passage terminates in the atmosphere so that the fluid egresses therefrom in a conical pattern. A pressure sensing tube extends into the vortex chamber to sense pressure along the axis of the chamber near the egress orifice, this pressure being a function of the input pressure and the position of the sensing tube. As an object approaches the axial egress orifice, a point is approached where the pressure in the sensing tube rises suddenly indicating the specific displacement of the object from the end of the egress orifice. The precise location at which the sudden rise in pressure is effected is a function of the input pressure to the vortex unit and thus specific distances from the end of the egress orifice may be measured as determined by the input pressure.

---

The present invention relates to proximity sensors and more particularly, to a proximity sensor for providing an output signal at a precise location of an object relative to a measuring orifice.

Proximity sensors have been previously provided in the fluidics art but the displacement of the device from the sensor at which an object may be detected has been restricted. A fluid egressing from an output passage or a control passage of a fluid amplifier senses an object at a distance which is relatively limited in displacement from the egress orifice of the device. For instance, the distance may be no greater than one or one and one-half times the diameter of the egress orifice and thus, as greater distances are to be sensed, the egress orifice must be made larger requiring a greater fluid flow due to the larger size passages.

In accordance with the present invention, there is provided a vortex proximity sensor in which displacements of an object from the egress passage at which the object may be detected is considerably greater than in the prior art devices and which may be as great as four to eight times the diameter of the egress orifice depending upon the pressure of the supply to the device.

The sensor comprises basically a vortex chamber with a tangential input flow and an axially located egress orifice. A small diameter sensing tube extends into the chamber in the region of the egress orifice. An object to be detected is caused to approach the egress orifice and, upon reaching a specific distance from the orifice, the pressure in the sensing tube rises rapidly. The precise location at which this rise occurs is a function of, among other things, the pressure of the tangential input flow and the relative diameters of the vortex chamber and the egress orifice. Conventional fluid or other types of circuits may be employed to detect the suddent rise in pressure in the sensing tube. The location at which detection occurs may also be varied by changing the bias on the fluid or other sensing circuit employed with the vortex sensor.

It is thus an object of the present invention to provide a proximity sensor which is a pure fluid proximity sensor operable to detect the precise location of objects at relatively large distances from the sensing apparatus.

It is another object of the present invention to provide an extremely simple and inexpensive proximity sensor capable of operation over relatively large sensing ranges which range may be varied by changing the input pressure to the apparatus or a bias pressure to a further device employed to sense changes in the pressures determined by the sensor per se.

The above and still further objects, features and advantages of the present invention will become apparent upon consideration of the following detailed description of one specific embodiment thereof, especially when taken in conjunction with the accompanying drawings, wherein.

Figure 1:
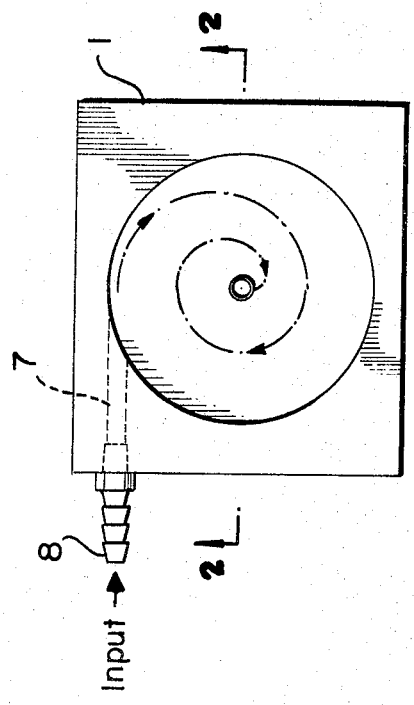
FIGURE 1 is a top view of a simple form of the apparatus of the present invention.
Figure 2:
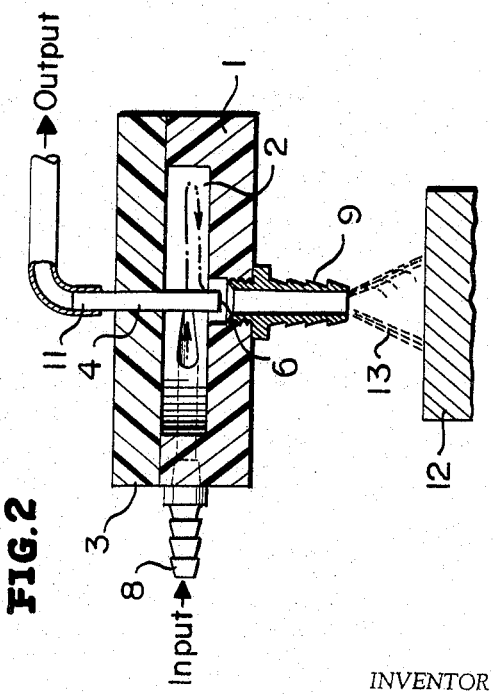
FIGURE 2 is a view in section taken along section line 2—2 of FIGURE 1.

Referring now specifically to FIGURES 1 and 2 of the accompanying drawings, there is illustrated a block of material 1 having formed therein a flat circular recess or chamber 2 constituting a vortex chamber in accordance with the present invention. The body 1 is covered by a plate 3 having a small orifice 4 axially aligned with the center of the chamber 2. An egress orifice 6 extends downwardly, as viewed in FIGURE 2, through the bottom of block 1 and is coaxial with the center of the chamber 2. The body 1 is provided with a further passage 7 extending through the side of the body and tangentially into the chamber 2 so as to provide tangential fluid flow into the chamber. Fluid may be supplied to the passage 7 through a Christmas tree fitting 8 adapted to receive some form of flexible or rigid hose (not illustrated) in turn connected to a source of fluid under pressure.

In the particular embodiment illustrated, a Christmas tree fitting 9 is threaded into the bottom of the member 1 in alignment with the egress passage 6 and thus is adapted to receive fluid egressing from the vortex chamber 2 during operation of the device and to dispense the fluid into the ambient atmosphere. A sensing tube 11 extends through the passage 4 in the top plate 3 and downwardly through the vortex chamber 2 into a region adjacent the egress orifice 6, the precise location of the tube 11 being determined as indicated subsequently.

When fluid is supplied to the chamber 2 through the passage 7, the fluid in the chamber is caused to rotate at an increasingly rapid rate as the center of the chamber is approached due to vortex velocity amplification. The fluid proceeds through the egress orifice 6 and the Christmas tree fitting 9 and egresses from the passage in the fitting in a conical pattern. It has been found that the conical flow is in sheet form; that is, the center of the cone up to a point adjacent and at times extending into the chamber 2 is relatively hollow and that the pressure in the hollow interior region of the cone is quite low relative to pressure downstream of the egress orifice of fitting 9. The low pressure region appears to result from the centrifugal forces in the high velocity rotational flow tending to throw all of the material against the interior walls of the fitting 9.

It has been found that, if an object to be sensed such as the body 12 illustrated in FIGURE 2 is caused to approach the end of the fitting 9, a point is reached at which the pressure interiorly of the fitting 9, egress orifice 6 and along the axis of the vortex chamber 2 suddenly rises in a very noticeable and discrete step and that this rise is sensed by the tube 11; that is, the pressure therein rises. The pressure sensed by tube 11 is the static pressure in the region of egress orifice 6. The term static pressure is used herein in contradistinction to dynamic pressure. Dynamic pressure of a fluid is a function of the flow velocity of that fluid and can be monitored by orienting a sensor tube opening to receive the desired velocity component of the onrushing fluid. Static pressure is the pressure of still or motionless fluid. The static pressure in a flowing fluid 8 monitored by cancelling or eliminating the effects of flow velocity. This may be done by orienting a pressure sensor tube opening in the fluid so as not to receive components of the flow. Sensor tube 11 is so oriented relative to the vortical flow in chamber 2 and therefore provides a measure of static pressure in the region of egress orifice 6.

The reasons for this occurrence have not been completely explored but it is believed that, when the body approaches to within a prescribed distance of the fitting 9, some of the fluid forming the conical sheet is caused to feed into the interior region defined by the cone and thus raises the pressure therein. More specifically, the cone of fluid which is designated by reference numeral 13 maintains its continuity or integrity over a certain distance from the end of the fitting 9 and that thereafter the fluid breaks up into discrete particles. If the object 12 is located in a region downstream of where the conical sheet of fluid 13 disperses, the object has substantially no effect upon the pressure interiorly of the passage 9. However, if the object 12 is raised so that it contacts the cone of fluid; that is, contacts the fluid before dispersal occurs, then the fluid of the cone tends to feed to the interior of the cone as well as the exterior thereof. The fluid fed to the interior of the cone increases the pressure in this region, and this increase in pressure is transmitted to the fitting 9, passage 6 and the vortex chamber 2.

Based on this theory, it would appear that the point at which the cone disperses is a function of input pressure since it has been found that, as the input pressure to the chamber 2 is increased, the distance downstream of the end of the fitting 9, at which a body produces a sudden rise in pressure, is greater than when the pressure is lower.

The extent to which the pipe 11 extends through the chamber 2 toward the egress orifice 6 is determined by the initial pressure at which it is desired to operate the sensing tube. If the sensing tube is flush with the upper surface of the chamber 2, the pressure therein is usually somewhat positive relative to the pressure downstream of fitting 9. (It is postulated that this pressure at this point could be negative if the height of the chamber is small enough.) If the tube is extended into the egress orifice, then normally the pressure therein is negative and, of course, at some location between these two positions the pressure is at ambient. Thus, the pipe 11 may be positioned to provide a pressure therein which comports with the particular sensing system to which the tube 11 is to be connected.

It should be pointed out that the fitting 9 is not at all essential to the operation of the apparatus, but its use does permit greater flexibility in the selection of the location of the body 1 relative to the vortex chamber per se.

Figure 3:
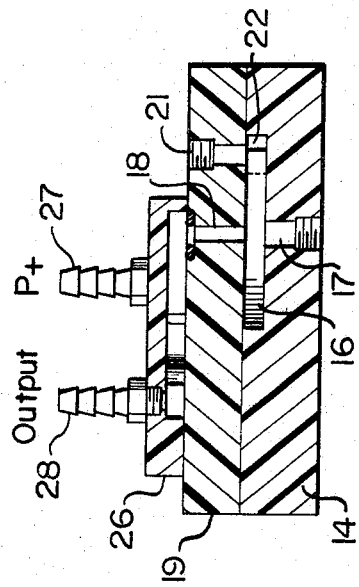
FIGURE 3 is a cross-sectional view of a second embodiment of the apparatus of the present invention taken along section line 3—3 of FIGURE 4.
Figure 4:
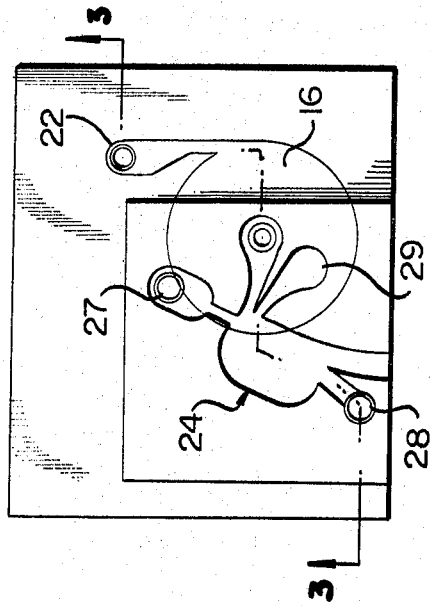
FIGURE 4 is a top view of the apparatus of FIGURE 3.

Referring now specifically to FIGURES 3 and 4 of the accompanying drawing, there is illustrated one practical embodiment of an apparatus employing the principles of operation of the present invention. The apparatus again comprises a suitable body 14 having a right cylindrical recess 16 formed therein to provide a vortex chamber. The chamber has a centrally located egress orifice 17 and a pressure sensing passage 18 extending through a cover plate 19 employed to seal in the upper surface of the chamber 16. Pressurized fluid is supplied through a passage 21 extending vertically, as viewed in FIGURE 3, through the cover plate 19 and into communication with a passage 22 (see FIGURE 4) for introducing fluid tangentially into the chamber 16. The sensing passage 18 extends through the block 19 into communication with a control passage 30 of an OR/NOR gate 24 formed in a plate 26 positioned on top of the cover plate 19. A source of pressure is connected to the OR/NOR gate 24 through a fitting 27 secured in the plate 26, the OR/NOR gate being provided also with an output fitting 28 also secured to the plate 26. A second control passage 29 of the OR/NOR gate 24 may be employed to provide a bias pressure to the unit so that the pressure at which the OR/NOR gate triggers may be varied in accordance with operating circumstances. This variability of trigger pressure permits a certain degree of latitude to be achieved which would otherwise be lost as a result of not being able to vary the position of the sensing port relative to the egress orifice as is the case in the apparatus of FIGURE 2 where the position of the pipe 11 may be varied axially relative to the egress passage 6.

As an example of an operative device, the chamber 16 is one inch in diameter and $1/10$ of an inch deep. The sensing passage has a $1/16$ of an inch inside diameter and the inside diameter of the egress orifice is about 0.09 inch. The passage entering tangentially into the chamber 16 in the region of entry into the chamber is 0.04 inch wide and $1/10$ of an inch deep. This device was provided with a pressure of ten pounds per square inch and the supply pressure to the OR/NOR gate was 0.75 p.s.i.g. The device switched repetitively and accurately at a displacement of the object to be detected, of $1/4$ inch from the end of the sensing aperture.

It should be noted that the passage 18 may contain a sensing tube such as the sensing tube 11 of FIGURE 1 and that this tube may be adjusted initially to provide specific pressures in the sensing passage 18, the adjustment being made before the plate 26 is applied; that is, before the OR/NOR gate is secured to the plate 19. The variable bias applied to the control passage 29 of the OR/NOR gate may be employed to make small final adjustments in the sensing position of the apparatus.

It should be apparent that various changes can be made in the parameters of the system without departing from the spirit of the invention. Thus, sensitivity of the device to changes in supply pressure may be somewhat reduced by making the vortex chamber larger at least in depth if not in diameter. This provides a larger storage of fluid and thus a greater inertia which inherently is less sensitive to small fluctuations in the supply pressure. Further, in a particular type of operation proximity, as such, is not the only parameter that can be measured. The device can be used to measure dimensions of a body conveyed below the detector parallel to, for instance, the plate 14 of FIGURE 3. When the object is directly under the sensing unit and its height above a fixed bed is insufficient to produce a large rise in pressure in the sensing tube, an output signal is not derived from the fitting 28 of FIGURE 3. On the other hand, if the device is of the proper size or conversely is oversized, the OR/NOR gate is triggered due to pressure rise at the control pasage 30. If a device is to have a range of sizes between two limits then by passing the object to be sensed under a first and then a second such proximity detector, it is possible to determine whether the device lies above or below a specific range or lies within a specific range of sizes or heights.

Also it is apparent that other means of sensing pressure in the vortex chamber may be employed. All that is required of the sensing device is that it produce an indication of a change in a fluid parameter which indication may be detected externally of the chamber.

While I have described and illustrated one specific embodiment of my invention, it will be clear that variations of the details of construction which are specifically illustrated and described may be resorted to without departing from the true spirit and scope of the invention.

What I claim is:

1. In a fluid system, a vortex chamber having an axis of symmetry, means for supplying fluid to said chamber peripherally of said chamber at a relatively large distance from said axis, said chamber having an outlet orifice of relatively small cross-sectional area located on said axis, fluid flow from said chamber having a predetermined unconstrained flow characteristic when movement of said fluid is vortical, and sensing means for determining static pressure in a region adjacent said outlet orifice and upstream of said outlet orifice.

2. A proximity detector comprising a vortex chamber having a pair of end walls, egress passage for said vortex chamber extending through one of said walls and located such as to have produced therein a rapidly rotating fluid flow upon rotation of fluid in said vortex chamber, said egress passage having an egress orifice for emitting unrestrained fluid flow therefrom and means for producing a signal indicative of changes in static fluid pressure in a region between said egress orifice and the other of said end walls.

3. The combination according to claim 2 wherein said signal is a fluid signal and further comprising fluid switch means having a pressure sensitive input for switching said switch upon pressure in said input achieving a predetermined level and means connecting said input to said means for detecting.

4. The combination according to claim 2 wherein said means for sensing is a hollow tube extending through said other end wall of said chamber.

5. The combination according to claim 4 wherein said signal is a fluid signal and further comprising fluid switch means having a pressure sensitive input for switching said switch upon pressure in said input achieving a predetermined level and means connecting said input to detect the pressure in said hollow tube.

6. The combination according to claim 5 said switch means being secured to said other of said end walls.

7. The combination according to claim 2 further comprising an amplifier for amplifying said signal produced by said means for producing and means for biasing said amplifier to vary the sensitivity of said amplifier to said signal.

8. The combination according to claim 7 wherein said signal is a fluid signal and wherein said amplifier is a fluidic switch having at least two states, said means for biasing determining the fluid signal level at which said amplifier switches from one state to another state.

9. A fluidic proximity sensor, comprising:
means for issuing a rotating substantially conical sheet of fluid flow from a predetermined location; and
means responsive to blockage of said rotating substantially conical sheet of fluid flow for providing a fluid signal.

10. The fluidic proximity sensor according to claim 9 wherein said means for issuing comprises:
a vortex chamber having egress passage means for issuing said rotating conical sheet of fluid in response sensor passage disposed for sensing static pressure to rotation of fluid in said chamber, and wherein said means for providing a fluid signal comprises a fluid at a location in the vortex of the rotating flow in said chamber.

11. The proximity sensor according to claim 10 further comprising fluid switching means for assuming a first state in response to the pressure in said sensor passage being below a predetermined level and for assuming a second state in response to the pressure in said sensor passage being equal to or greater than said predetermined level.

12. The proximity sensor according to claim 11 wherein said sensor passage and said egress passage means are defined through respective opposing walls of said chamber and in substantial alignment with one another and wherein said fluid switching means comprises a fluidic amplifier element secured to the exterior side of the chamber wall through which said sensor passage is defined and disposed for receiving the fluid pressure in said sensor passage as an amplifier input signal.

13. A fluidic proximity sensor comprising:
a vortex chamber of substantially circular cross section having an axis of symmetry disposed normal to said cross section, an egress orifice disposed symmetrically about said axis of symmetry, means for supplying fluid to said chamber, and means for rotating said fluid about said axis of symmetry such that fluid egresses from said egress orifice in a predetermined unconstrained flow pattern; and
means for providing a fluid pressure signal above a specified pressure level in response to interruption of said predetermined flow pattern within a specified distance from said egress orifice.

14. The fluidic proximity sensor according to claim 13 wherein said means for providing a fluid pressure signal comprises a fluid passage disposed for sensing static pressure at a location along said axis of symmetry interiorly of said chamber.

References Cited
UNITED STATES PATENTS

| | | |
|---|---|---|
| 3,272,213 | 9/1966 | Jones. |
| 3,340,737 | 9/1967 | Reilly. |
| 3,276,259 | 10/1966 | Bowles et al. _____ 73—194 |
| 3,413,995 | 12/1968 | Bowles et al. _____ 137—81.5 |

LOUIS R. PRINCE, Primary Examiner

W. A. HENRY, Assistant Examiner